United States Patent Office 3,067,249
Patented Dec. 4, 1962

3,067,249
PURIFYING AROMATIC ACIDS BY TREATMENT WITH MORPHOLINE
Carolyn L. Lewis, New Castle, Del., assignor to Sun Oil Company, Philadelphia, Pa., a corporation of New Jersey
No Drawing. Filed May 20, 1959, Ser. No. 814,381
1 Claim. (Cl. 260—525)

Aromatic carboxylic acids, e.g. terephthalic acid, which are produced by partial oxidation, in metal equipment, of alkyl aromatic compounds, e.g. p-xylene, in the liquid phase with a metallic catalyst, e.g. a cobalt catalyst, frequently contain sufficient quantities of cobalt and other metallic impurities to make them unsuitable for various uses, e.g. for the production of polyethylene terephthalate fibers. Frequently the visual characteritsics of the acids are also unsatisfactory.

It has now been found that highly satisfactory reduction in metal content of such aromatic acids can be obtained, together with substantial improvement in visual characteristics by certain procedures involving contacting the acids with morpholine to form salts of morpholine with the acids. The improvement in visual characteristics may involve an increase in brightness or a reduction in yellow coloration, or both.

In one embodiment, the salts in solid form are separated from excess morpholine containing color bodies dissolved from the original aromatic acids. Free aromatic acid having improved color can be recovered from the separated salts by any suitable method, e.g. acidification, thermal decomposition, etc. In one embodiment, the separated salts are dissolved in water or other suitable solvent, and the resulting solution subjected to treatment adapted to release aromatic acid from the salts and precipitate the aromatic acid from the aqueous solution. A subsequent separation of the aromatic acid from the aqueous phase has been found to provide a beneficial further purification of the acid, and produce a particularly good product from the standpoint of low metal content and freedom from yellow coloration.

In another embodiment, morpholine salts of the aromatic acid to be purified are dissolved in water without previous separation from excess morpholine, and the solution is subjected to the above described treatment for release, precipitation and separation of the aromatic acid. This embodiment has been found to be particularly well adapted to the obtaining of a good yield of a bright product having low metal content.

In Patent No. 2,829,160, which issued April 1, 1958, to C. J. Stehman et al., the purification of terephthalic acid by dissolving in pyridine, adding morpholine to precipitate a salt of terephthalic acid, filtering the salt from the pyridine, washing pyridine from the filtered salt with acetone for example, and subjecting the separated salt to further purification procedure, is disclosed. The impurities which are removed are isophthalic acid and toluic acids. This process requires the use of pyridine in addition to morpholine, and the use of a solvent to wash pyridine from the morpholine terephthalic filter cake.

These requirements are eliminated according to the present invention as a result of the discovery, that morpholine terephthalate for example is sufficiently insoluble in morpholine to permit, in one embodiment, the use of excess morpholine as an extracting agent to remove color bodies from the morpholine salt of the dibasic acid. Also, it has been discovered that highly satisfactory removal of metal contaminants can be obtained, together with substantial brightening of the aromatic acids, in one embodiment, by omitting separation of morpholine salt from either morpholine or pyridine, and relying instead on separation of precipitated aromatic acid from an aqueous or other solution containing dissolved contaminants. The latter procedure can if desired be combined with a previous separation for example, of an aqueous solution of morpholine salt of the aromatic acid from water-insoluble contaminants.

Any suitable method of precipitating aromatic acid from the salt can be employed. In one embodiment, an acid is added to displace the aromatic acid from the salt. Acids stronger than the aromatic acid are generally suitable for this purpose. Sulfuric acid, hydrochloric acid, and many others that will be evident to a person skilled in the art can be employed.

Room temperature is advantageously employed in the various separations of aromatic acid or salt from morpholine, or from aqueous solutions, in the process according to the invention, although higher temperatures can be employed, e.g. up to 250° F. or higher. Lower temperatures could also be used, but are usually avoided for practical reasons. Atmospheric pressure will usually be employed, though higher or lower pressures can be used, pressure not being critical.

In the embodiment where morpholine salt is separated, e.g. by filtration, from excess morpholine, the amount of the latter is preferably in the approximate range from 50 to 500 weight percent based on aromatic acid, though other amounts can be used in some cases.

Where morpholine salt of aromatic acid is dissolved in water or other polar solvent, and the acid subsequently precipitated, the aqueous solution preferably has concentration which is in the range from 25 to 100% of the saturation concentration, though more dilute solutions can be used in some cases. The amount and strength of strong acid, e.g. sulfuric acid, used in the precipitation, are preferably such as to precipitate the aromatic acid completely, except in cases as subsequently described where selective precipitation of one of a mixture of acids is desired. In the light of the present specification, a person skilled in the art can select proper conditions to produce the desired result.

The process of the invention is applicable to aromatic carboxylic acids generally, as produced by known processes for liquid phase partial oxidation of alkyl aromatic compounds. Examples of suitable charge stocks are isophthalic acid produced by partial oxidation of m-xylene, benzoic acid produced by partial oxidation of toluene, 2,6-naphthalic acid produced by partial oxidation of 2,6-dimethyl naphthalene, alphanaphthoic acid produced by partial oxidation of alphamethyl naphthalene, etc.

In one embodiment, the process is applied to mixtures of isophthalic acid and terephthalic acid produced in liquid phase partial oxidation of mixtures of m-xylene and p-xylene. In this embodiment, a solid mixture of morpholine isophthalate and morpholine terephthalate is contacted with an acidic material to liberate as free dibasic acid a portion, e.g. 10 to 90 weight percent, preferably 25 to 75 weight percent, of the total dibasic acid in the morpholine salt mixture. The liberated acid is then separated from an aqueous or alcoholic solution of the remaining morpholine salt of dibasic acid. The separated acid is a terephthalic acid concentrate containing for example at least 90 weight percent of terephthalic acid, as compared with 20 to 80 weight percent in a typical original mixture of isophthalic acid and terephthalic acid. A correspondingly concentrated isophthalic acid can then be obtained from the morpholine salt according to procedure as subsequently described.

The following examples illustrate the invention. In these examples, the reflectances of the dibasic acid products to light of 400 and 550 millimicron wave length respectively were determined, relative to a standard white material, using a modified Beckman Model D.U. spectrophotometer.

Slit widths of 1.65 mm. and 1.0 mm. were employed at 400 and 550 millimicrons respectively. The reflectance at 550 millimicrons indicates the brightness of the sample, and high numbers indicate a good sample; a pure white sample would have 100 reflectance at this wave length, on the scale employed. The difference between the reflectances at 400 and 550 millimicrons respectively is a measure of the degree of yellow coloration, and low numbers indicate a good sample; a pure white sample would have zero reflectance difference.

*Example 1*

The charge stock was a mixture of about 60 weight parts of isophthalic acid and 40 weight parts of terephthalic acid. This mixture was produced in a previous liquid phase oxidation of a mixture of m-xylene and p-xylene at a temperature of about 300° F., using pure oxygen as oxidizing agent and cobalt acetate as catalyst. The mixed dibasic acids were filtered from xylenes and toluic acids to obtain as filter cake the charge stock for this example.

16.6 grams of the dibasic acid mixture were stirred at 135° F. for ½ hour with 19.4 grams of morpholine and 200 cc. of distilled water. This was a 10% excess of morpholine over the stoichiometric amount. The resulting aqueous solution of morpholine salts of dibasic acids was filtered to remove a small amount of undissolved impurities. To the filtrate, 9.1 cc. of 96% sulfuric acid were added to reduce the pH of the solution from 7.75 to 1.5, and thereby precipitate mixed isophthalic acid and terephthalic acid from the solution. The precipitated acids were filtered and washed with water.

The following table shows the metal contents and the brightness (reflectance at 550 millimicrons) for charge stock and product. The table also shows the weight percent yield based on charge stock.

|  | Charge stock | Product |
| --- | --- | --- |
| Metal content in p.p.m.: |  |  |
| Cobalt | 230 | <10 |
| Iron | 150 | 16 |
| Nickel | 80 | 0 |
| Aluminum | 250 | 10 |
| Chromium | 6 | 3 |
| Brightness | 85 | 91 |
| Yield in percent |  | 88.5 |

These data show that the treatment substantially reduced the metal contents and increased the brightness.

*Example 2*

25 grams of the charge stock of Example 1 were stirred at room temperature for 45 minutes with 150 cc. of morpholine in the absence of water. The mixture at the end of this time was a slurry of solid morpholine salts of dibasic acids in excess morpholine. The solid salts were filtered from the excess morpholine, which was considerably darker than the original morpholine, indicating substantial extraction of color bodies from the charge stock by the morpholine.

The filter cake was dissolved in distilled water, and the resulting aqueous solution of morpholine dibasic acid salts was filtered to remove a small amount of undissolved impurities. To the filtrate, 21.2 cc. of 96% aqueous sulfuric acid were added, to reduce the pH from 8.75 to 1.5 and thereby precipitate mixed isophthalic and terephthalic acids. The precipitate was filtered, repulped with water, and filtered again to obtain a dibasic acid product having the following properties: brightness (reflectance at 550 millimicrons) 86.5, and color (reflectance difference between 400 and 550 millimicrons) 25.7. The corresponding properties of the charge stock were 85 and 32.5 respectively. Thus, yellow coloration was reduced, and an increase of brightness was also obtained. The yield was 80 weight percent based on charge. The metal contents of the product were as follows: cobalt, 5 p.p.m.; iron, 5 p.p.m.; aluminum, 10 p.p.m.; chromium, 0.7 p.p.m.; nickel, 0 p.p.m.

In another experiment, it was found that the Example 1 treatment gives better metals removal than a corresponding procedure employing ammonia instead of morpholine to form salts with the aromatic acids.

Generally similar results to those obtained in the preceding examples are obtained employing other aromatic acids as charge stock, e.g. benzoic acid, m-toluic acid, p-toluic acid, alpha-naphthoic acid, 2,6-naphthalic acid, trimesic acid, etc., obtained by liquid phase metal-catalyzed oxidation of, respectively, toluene, m-xylene, p-xylene, alpha-methyl naphthalene, 2,6-dimethyl naphthalene, mesitylene, etc. The invention is applicable generally to the products of the known oxidations of alkyl aromatic compounds in liquid phase to aromatic carboxylic acids using a metal, usually cobalt or manganese, salt, oxide, or hydroxide as catalyst.

Generally similar results to those obtained in the preceding examples are also obtained employing other solvents than water for the morpholine salts. Lower alcohols such as methanol, isopropanol, etc., can be employed, for example, either in the anhydrous state or admixed with water.

The invention claimed is:

Process for removing from aromatic carboxylic acids metal contaminants selected from the group consisting of cobalt, iron, nickel, chromium and aluminum contaminants and for improving the visual characteristics of said acids which consists essentially of: contacting aromatic carboxylic acid obtained by liquid phase partial oxidation of an alkyl aromatic compound selected from the group consisting of alkylbenzenes and alkyl-naphthalenes using a metallic oxidation catalyst selected from the group consisting of cobalt and manganese catalyst, with a treating agent consisting essentially of morpholine, in amount greater than the theoretical amount for neutralization of said acid, thereby to obtain a mixture of solid morpholine salt of said carboxylic acid and excess liquid morpholine, separating the solid morpholine salt from the excess morpholine containing color bodies, adding to the separated salt a solvent selected from the group consisting of water and lower alkanols, and an acid stronger than the aromatic carboxylic acid, thereby to precipitate said carboxylic acid as a solid material, separating the precipitated carboxylic acid from said solvent, thereby to obtain aromatic carboxylic acid having increased reflectance at 550 millimicrons, reduced yellow coloration and reduced metal content as compared with the original carboxylic acid.

References Cited in the file of this patent

UNITED STATES PATENTS

| 2,664,440 | Toland | Dec. 29, 1953 |
| 2,829,160 | Stehman et al. | Apr. 1, 1958 |
| 2,862,963 | Fuchs et al. | Dec. 2, 1958 |